(12) United States Patent
Qu et al.

(10) Patent No.: US 11,567,387 B2
(45) Date of Patent: Jan. 31, 2023

(54) PEEPING PREVENTION STRUCTURE, DISPLAY DEVICE AND DISPLAY METHOD

(71) Applicants: BEIJING BOE DISPLAY TECHNOLOGY CO., LTD., Beijing (CN); BOE TECHNOLOGY GROUP CO., LTD., Beijing (CN)

(72) Inventors: Lianjie Qu, Beijing (CN); Bingqiang Gui, Beijing (CN); Yonglian Qi, Beijing (CN); Hebin Zhao, Beijing (CN); Yun Qiu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 334 days.

(21) Appl. No.: 16/643,105

(22) PCT Filed: Apr. 19, 2019

(86) PCT No.: PCT/CN2019/083428
§ 371 (c)(1),
(2) Date: Feb. 28, 2020

(87) PCT Pub. No.: WO2019/206035
PCT Pub. Date: Oct. 31, 2019

(65) Prior Publication Data
US 2020/0209702 A1    Jul. 2, 2020

(30) Foreign Application Priority Data
Apr. 26, 2018 (CN) .......... 201810385869.0

(51) Int. Cl.
*G02F 1/167* (2019.01)
*G02F 1/1676* (2019.01)
(Continued)

(52) U.S. Cl.
CPC .......... *G02F 1/167* (2013.01); *G02F 1/13439* (2013.01); *G02F 1/133377* (2013.01); *G02F 1/1676* (2019.01)

(58) Field of Classification Search
CPC .. G02F 1/167; G02F 1/1681; G02F 1/134363; G02F 1/16762; G02F 1/1676;
(Continued)

(56) References Cited

U.S. PATENT DOCUMENTS

| 2004/0119680 A1* | 6/2004 | Daniel | G09G 3/344 |
| | | | 345/107 |
| 2013/0077009 A1* | 3/2013 | Asako | G02F 1/1339 |
| | | | 349/42 |

(Continued)

FOREIGN PATENT DOCUMENTS

| CN | 103091883 A | 5/2013 |
| CN | 103097951 A | 5/2013 |

(Continued)

OTHER PUBLICATIONS

International Search Report and Written Opinion for Application No. PCT/CN2019/083428, dated Jul. 4, 2019, 11 Pages.

*Primary Examiner* — Brandi N Thomas
(74) *Attorney, Agent, or Firm* — Brooks Kushman P.C.

(57) ABSTRACT

A peeping prevention structure, a display device and a display method are provided. The peeping prevention structure includes: a first electrode and a second electrode opposite to each other; a plurality of transparent columnar cavities between the first electrode and the second electrode, wherein a plurality of opening regions are defined between the plurality of transparent columnar cavities, and each of the plurality of transparent columnar cavities is filled with charged light-absorbing particles; wherein, the charged light-absorbing particles are configured to, under a control of an electric field between the first electrode and the second (Continued)

electrode, be uniformly diffused in the transparent columnar cavity or be concentrated at an end of the transparent columnar cavity.

10 Claims, 4 Drawing Sheets

(51) Int. Cl.
*G02F 1/1333* (2006.01)
*G02F 1/1343* (2006.01)

(58) Field of Classification Search
CPC ............... G02F 1/1677; G02F 1/1679; G02F 1/134309; G02F 1/133753; G02F 1/16761; G02F 1/1685; G02F 1/133512; G02F 1/13439; G02F 1/133377; G02F 1/133707; G02F 1/133776; G02F 1/16756; G02F 1/16766; G02F 2001/1678; G02F 1/133711; G02F 1/133715; G02F 1/133761; G02F 1/16757; G02F 2202/022; G02F 1/1334; G02F 1/133606; G02F 1/155; G02F 1/1671; G02F 2201/124; G02F 2201/44; G02F 2202/36; G02F 2203/12; G02F 1/0126; G02F 1/015; G02F 1/01716; G02F 1/1323; G02F 1/133305; G02F 1/13334; G02F 1/133351; G02F 1/133368; G02F 1/133514; G02F 1/133612; G02F 1/133618; G02F 1/133742; G02F 1/133757; G02F 1/1339; G02F 1/13392; G02F 1/13394; G02F 1/13415; G02F 1/1347; G02F 1/136209; G02F 1/15; G02F 1/1506; G02F 1/161; G02F 1/1673; G02F 1/1675; G02F 2201/12; G02F 2201/121; G02F 2201/123; G02F 2201/50; G02F 2202/10; G02F 2202/28; G02F 2202/42; G02F 2203/01; G02F 2203/09; G02F 2203/62; G09G 3/344; G09G 3/3446; G09G 2300/06; G09G 2300/08; G09G 2320/0252; G09G 2310/0262; G09G 2300/0426; G09G 2310/061; G09G 2320/0209; G09G 2300/0434; G09G 2310/06; G09G 2320/02; G09G 2300/0439; G09G 2310/068; G09G 3/2003; G09G 2300/04; G09G 2300/0852; G09G 2320/0204; G09G 2320/0233; G09G 2320/0257; G09G 2320/066; G09G 3/2007; G09G 3/2074; G09G 2300/043; G09G 2300/0452; G09G 2300/0456; G09G 2300/0473; G09G 2300/0809; G09G 2300/0814; G09G 2300/0876; G09G 2310/0205; G09G 2310/0248; G09G 2310/0254; G09G 2310/0275; G09G 2310/062; G09G 2310/063; G09G 2310/08; G09G 2320/04; G09G 2320/046; G09G 2330/021; G09G 2340/16; G09G 3/2011; G09G 3/2014; G09G 3/2081; G09G 3/2085; G09G 3/3433; G09G 3/3453; G09G 3/348; G09G 3/3493; G09G 3/3662; G09G 5/10

See application file for complete search history.

(56) References Cited

U.S. PATENT DOCUMENTS

| | | | |
|---|---|---|---|
| 2013/0115818 A1* | 5/2013 | Su | H05K 3/323 439/625 |
| 2013/0162924 A1 | 6/2013 | Sahouani et al. | |
| 2014/0063386 A1 | 3/2014 | Yang et al. | |
| 2018/0113289 A1 | 4/2018 | Wu | |

FOREIGN PATENT DOCUMENTS

| | | |
|---|---|---|
| CN | 105842830 A | 8/2016 |
| CN | 106970482 A | 7/2017 |
| CN | 108375858 A | 8/2018 |
| WO | 2017156700 A1 | 9/2017 |

* cited by examiner

PEEPING PREVENTION STRUCTURE, DISPLAY DEVICE AND DISPLAY METHOD

CROSS-REFERENCE TO RELATED APPLICATION APPLICATIONS

This application is the U.S. national phase of PCT Application No. PCT/CN2019/083428 filed on Apr. 19, 2019, which claims priority to Chinese Patent Application No. 201810385869.0 on Apr. 26, 2018 which are incorporated herein by reference in their entireties.

TECHNICAL FIELD

The present disclosure relates to the field of display technology, and in particular, relates to a peeping prevention structure, a display device and a display method.

BACKGROUND

With development of display technology, display devices such as mobile phones and computers have become more and more widely used. Generally, a display device has a wide viewing angle, and users at different viewing angles may learn information displayed by the display device. However, in some scenarios, a user hopes that the information displayed by the display device is not known by other surrounding users, that is, the display device is required to have a peeping prevention function.

SUMMARY

Some embodiments of the present disclosure provide a peeping prevention structure, a display device and a display method.

In a first aspect, the present disclosure provides a peeping prevention structure. The peeping prevention structure includes: a first electrode and a second electrode opposite to each other; a plurality of transparent columnar cavities between the first electrode and the second electrode, wherein a plurality of opening regions are defined between the plurality of transparent columnar cavities, and each of the plurality of transparent columnar cavities filled with charged light-absorbing particles; wherein the charged light-absorbing particles are configured to, under a control of an electric field between the first electrode and the second electrode, be uniformly diffused in the transparent columnar cavity or be concentrated at an end of the transparent columnar cavity.

Optionally, the peeping prevention structure further includes a first substrate and a second substrate opposite to each other; the first electrode is on a side of the first substrate facing the second substrate; the second electrode is on a side of the second substrate facing the first substrate.

Optionally, the first electrode may be a planar transparent electrode or be made of a metal conductive wire; the second electrode may be a planar transparent electrode or be made of a metal conductive wire.

Optionally, in a case that the first electrode is made of the metal conductive wire, an orthographic projection of an end, near the first substrate, of the transparent columnar cavity on the first substrate covers the first electrode; in a case that the second electrode is made of the metal conductive wire, an orthographic projection of an end, near the second substrate, of the transparent columnar cavity on the second substrate covers the second electrode.

Optionally, in a case that there is the electric field applied between the first electrode and the second electrode, the charged light-absorbing particles are concentrated at an end of the transparent columnar cavity, in a case that there is no electric field applied between the first electrode and the second electrode, the charged light-absorbing particles are uniformly diffused in the transparent columnar cavity.

Optionally, a shape of a cross section of each of the transparent columnar cavities in a plane perpendicular to the first electrode or the second electrode is rectangular or trapezoidal.

In a second aspect, the present disclosure provides a display device. The display device includes a display panel and the peeping prevention structure, according to the first aspect, attached to a light emitting side of the display panel, wherein, each opening region of the plurality of opening regions of the peeping prevention structure corresponds to at least one pixel area of the display panel.

Optionally, in a case that the display device includes a first substrate and a second substrate opposite to each other, the first substrate or the second substrate of the peeping prevention structure is reused by a base substrate on the light emitting side of the display panel.

Optionally, the plurality of opening regions of the peeping prevention structure correspond to a plurality of pixel areas of the display panel in a one to one manner, an orthographic projection of each of the plurality of opening regions on the display panel coincides with one of the plurality of pixel areas.

Optionally, the display device further includes a controller, the controller is configured to control an electrical signal applied to the first electrode and the second electrode, so that intensity of the electric field between the first electrode and the second electrode is controlled by controlling the electrical signal, so that the peeping prevention structure is capable of being switched between a first state and a second state; in the first state, the charged light-absorbing particles are uniformly diffused in the transparent columnar cavity; in the second state, the charged light-absorbing particles are concentrated at an end of the transparent columnar cavity.

Optionally, a projection of each of the plurality of transparent columnar cavities on the display panel is located within a black matrix of the display panel.

In a third aspect, the present disclosure provides a display method of a display device. The method is applied to a display device according to the first aspect, and the method includes: controlling an electrical signal applied to the first electrode and the second electrode, so that intensity of the electric field between the first electrode and the second electrode is controlled by controlling the electrical signal, so that the peeping prevention structure is capable of being switched between a first state and a second state; in the first state, the charged light-absorbing particles are uniformly diffused in the transparent columnar cavity; in the second state, the charged light-absorbing particles are concentrated at an end of the transparent columnar cavity.

Optionally, the display method further includes: applying no electrical signal to the first electrode and the second electrode, so that the charged light-absorbing particles are uniformly diffused in the transparent columnar cavity: applying an electrical signal to the first electrode and the second electrode, so that the charged light-absorbing particles move towards the first electrode or the second electrode and are concentrated at an end of the transparent columnar cavity.

In a fourth aspect, the present disclosure provides a method of manufacturing a peeping prevention structure. The method includes: providing a first substrate, depositing a layer of transparent conductive material on the first substrate as a first electrode; forming a transparent insulating film on the first electrode, and patterning the transparent insulating film to form a plurality of transparent columnar cavities: filling charged light-absorbing particles in each of the plurality of transparent columnar cavities; providing a second substrate, forming a second electrode on the second substrate; assembling the first electrode and the second electrode to form a cell, so that the second electrode faces the first electrode, and the second electrode is in direct contact with the transparent insulating film.

Optionally, filling the charged light-absorbing particles in each of the plurality of transparent columnar cavities includes: filling the transparent columnar cavity with liquid, and enabling the charged light-absorbing particles to be filled in the liquid, wherein, a concentration of the charged light-absorbing particles allows the charged light-absorbing particles to be uniformly diffused in an entirety of the transparent columnar cavity and to form a blocking wall that blocks light.

Optionally, a shape of a cross section of each transparent columnar cavity of the transparent columnar cavities in a plane perpendicular to the first electrode or the second electrode is rectangular or trapezoidal.

DETAILED DESCRIPTION

In order to make technical problems, technical solutions and advantages of the embodiments of the present disclosure clearer, the present disclosure will be clearly and completely described in detail below with reference to drawings and specific embodiments.

The present disclosure provides a peeping prevention structure, a display device having the peeping prevention structure and a display method. The peeping prevention structure, the display device having the peeping prevention structure and the display method thereof may switch the display device between a peeping prevention state and a non-peeping prevention state, and may reduce difficulty of a manufacturing process and increase a peeping prevention effect.

Figure 1:
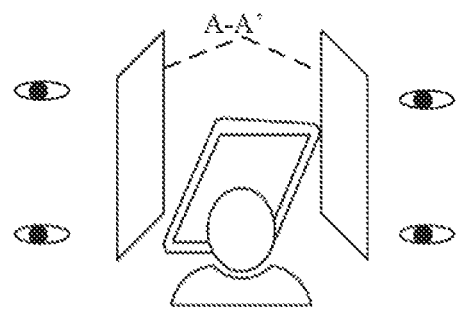
FIG. 1 is a schematic diagram of a principle of a display device in a peeping prevention state according to the present disclosure.

FIG. 1 is a schematic diagram of a principle of a display device in a peeping prevention state according to the present disclosure. In a case that a peeping prevention display function is implemented (i.e., in the peeping prevention state), a three-dimensional viewing-angle restricted area A-A' may be formed in an area above a display side of a display panel, so as to prevent users outside the viewing-angle restricted area A-A' from seeing content displayed on the display panel.

Figure 2:
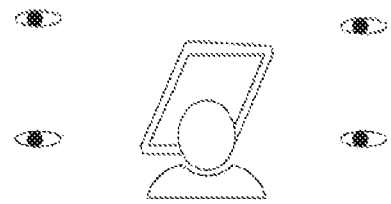
FIG. 2 is a schematic diagram of a principle of a display device in a non-peeping prevention state according to the present disclosure.

FIG. 2 is a schematic diagram of a principle of a display device in a normal display state according to the present disclosure. During the normal display state (i.e., in a non-peeping prevention state), there is no three-dimensional viewing-angle restricted area A-A' on the display side of the display panel, so that any user may see content displayed on the display panel.

Some embodiments of the present disclosure provide a peeping prevention structure. The peeping prevention structure may be used in a display panel of a display device, such as a liquid crystal display panel or an OLED display panel. The peeping prevention structure may include: a first electrode and a second electrode opposite to each other; a plurality of transparent columnar cavities between the first electrode and the second electrode, wherein a plurality of opening regions are defined by the plurality of transparent columnar cavities, each of the transparent columnar cavities is filled with liquid and charged light-absorbing particles in the liquid, and a longitudinal section of the transparent columnar cavity (i.e., a cross section in a plane perpendicular to the first electrode or the second electrode) is trapezoidal or rectangular, an electric field is disposed between the first electrode and the second electrode. Under a control of the electric field, the peeping prevention structure is capable of being switched between a first state and a second state; in the first state, the charged light-absorbing particles are uniformly diffused in the transparent columnar cavity; in the second state, the charge light-absorbing particles are concentrated at an end of the transparent columnar cavity.

In the present disclosure, under a control of an electric field between the first electrode and the second electrode, the peeping prevention structure is capable of being switched between a first state and a second state; in the first state, the charged light-absorbing particles are uniformly diffused in the transparent columnar cavity, to form a blocking wall that blocks light. In this way, light emitted by pixels of the display device may only be emitted through opening regions between the plurality of transparent columnar cavities, thereby achieving viewing angle restriction and the peeping prevention display function. The higher the transparent columnar cavity is, the smaller the viewing angle is, and the peeping prevention effect is the better; in the second state, the charged light-absorbing particles are concentrated at an end of the transparent columnar cavity, to achieve a normal display function. By the technical solution of the present disclosure, it is possible to switch the display device between the peeping prevention state and the non-peeping prevention state. In addition, in a case that the longitudinal section of the transparent columnar cavity is trapezoidal, a manufacturing process is simpler and the peeping prevention effect is fluffier increased.

Further, the peeping prevention structure further includes a first substrate and a second substrate opposite to each other; the first electrode is on a side of the first substrate facing the second substrate; the second electrode is on a side of the second substrate facing the first substrate. The first electrode may be a planar transparent electrode or be made of a metal conductive wire; the second electrode may be a planar transparent electrode or be made of a metal conductive wire.

In order to avoid influence of the planar transparent electrode on the light emitted from the display panel, optionally, the first electrode and the second electrode may also be made of the metal conductive wire, and an orthographic projection of the electrode near the display panel on the display panel falls into a black matrix of the display panel, which may reduce the influence of the first electrode and the second electrode on the light emitted from the display panel.

Further, in a case that the first electrode is made of the metal conductive wire, an orthographic projection of an end of the transparent columnar cavity near the first substrate on the first substrate covers the first electrode, in this way, during the normal display state, light blocked by the metal conductive wire may be minimized, in a case that the second electrode is made of the metal conductive wire, an orthographic projection of an end of the transparent columnar cavity near the second substrate on the second substrate covers the second electrode, in this way, during the normal display state, light blocked by the metal conductive wire may be minimized.

An example of a display device having a peeping prevention structure provided by the present disclosure is described below with reference to a specific example.

Figure 3A:
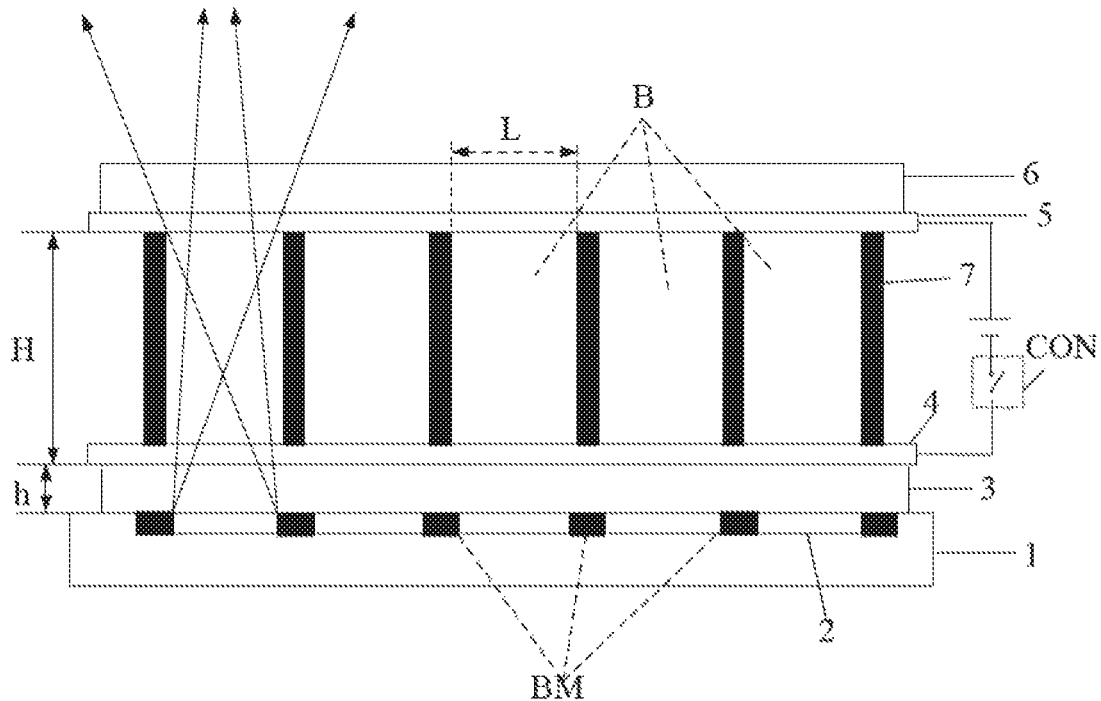
FIG. 3A is a first structural schematic diagram of a display device having a peeping prevention structure according to the present disclosure.

FIG. 3A is a structural schematic diagram of a display device having a peeping prevention structure according to the present disclosure. As shown in FIG. 3A, the display device having the peeping prevention structure includes a display panel 1, a first substrate 3 on the display panel 1, a first electrode 4 on the first substrate 3, a plurality of transparent columnar cavities 7 on the first electrode 4, a second electrode 5 on the plurality of transparent columnar cavities 7, a second substrate 6 on the second electrode 5. The plurality of opening regions B are defined between the plurality of transparent columnar cavities 7, a longitudinal section of each of the transparent columnar cavities 7 is rectangular, the plurality of opening regions B correspond to a plurality of pixels 2 of the display panel 1 in a one to one manner, the plurality of transparent columnar cavities 7 are filled with liquid and charged light-absorbing particles 8 are distributed in the liquid, a concentration of the charged light-absorbing particles 8 is controlled to uniformly be diffused in the entirety of the transparent columnar cavity 7, to form a blocking wall 9 that blocks light.

The present disclosure provides a method of manufacturing a peeping prevention structure. The method of manufacturing a peeping prevention structure may manufacture a peeping prevention structure shown in FIG. 3A. The method includes the following steps: providing a first substrate 3 on a display panel 1, depositing a layer of transparent conductive material on the first substrate 3 as a first electrode 4; forming a transparent insulating film having a thickness of H on the first electrode 4, and patterning the transparent insulating film to form a plurality of transparent columnar cavities 7, wherein a plurality of opening regions B are defined between the plurality of transparent columnar cavities 7, the plurality of opening regions B correspond to a plurality of pixels 2 of the display panel 1 in a one to one manner; filling the transparent columnar cavity 7 with the charged light-absorbing, particles 8, wherein, a concentration of the charged light-absorbing particles 8 is control to uniformly be diffused in the transparent columnar cavity 7 and to form a blocking wall 9 that blocks light; providing a second substrate 6, forming a second electrode 5 on the second substrate 6, wherein the second electrode 5 may be made of a transparent conductive material such as ITO; assembling the first electrode 4 and the second electrode 5 to form a cell, so that the second electrode 5 faces the first electrode 4, and the second electrode 5 is in direct contact with the transparent insulating film.

In a case that the display device is in a peeping prevention state, as shown in FIG. 3A, no electricity is applied between the first electrode 4 and the second electrode 5, and the charged light-absorbing particles 8 are uniformly diffused in the entire transparent columnar cavity 7. In this way, light emitted by the pixels 2 may only be emitted through the opening regions B surrounded by the transparent columnar cavities 7. The higher the transparent columnar cavity 7 is, the smaller the viewing angle is, and the peeping prevention effect is the better.

Figure 4:
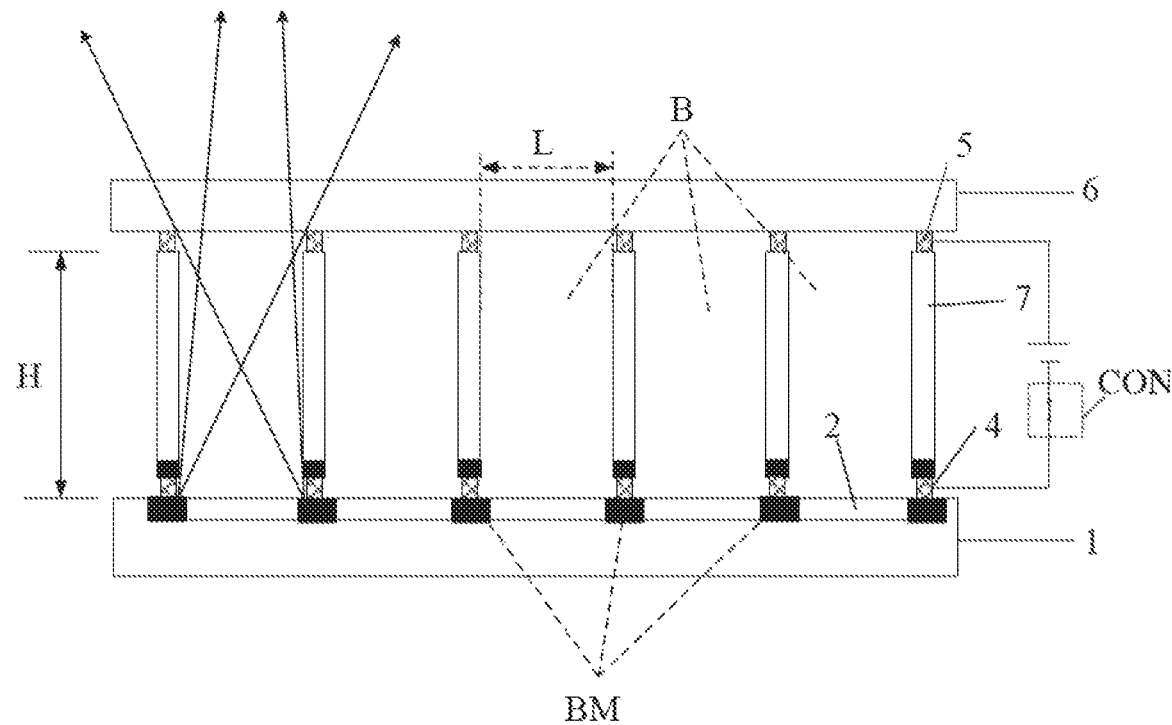
FIG. 4 is still another structural schematic diagram of a display device having a peeping prevention structure according to the present disclosure.

In a case that the display device is in a non-peeping prevention state, as shown in FIG. 4, there is electricity applied between the first electrode 4 and the second electrode 5, and the charged light-absorbing particles 8 are concentrated on a side of the first substrate 3 or the second substrate 6. Optionally, the charged light-absorbing particles 8 are concentrated on the side of the first substrate 3 near the display panel 1. Because a black matrix BM is disposed on the display panel 1, an orthographic projection of the charged light-absorbing particles 8 on the display panel 1 falls into the black matrix BM, which has less influence on the display effect. The display panel 1 may be a liquid crystal display panel or an OLED display panel.

The charged light-absorbing particles 8 of the present disclosure may be any charged light-absorbing particles that may implement the technical principles of the present disclosure. The liquid in the transparent columnar cavity 7 of the present disclosure may be any liquid in which the charged light-absorbing particles 8 are suspended. Specific examples of the charged light-absorbing particles 8 and the liquid may be selected as desired by those skilled in the art.

Figure 3B:
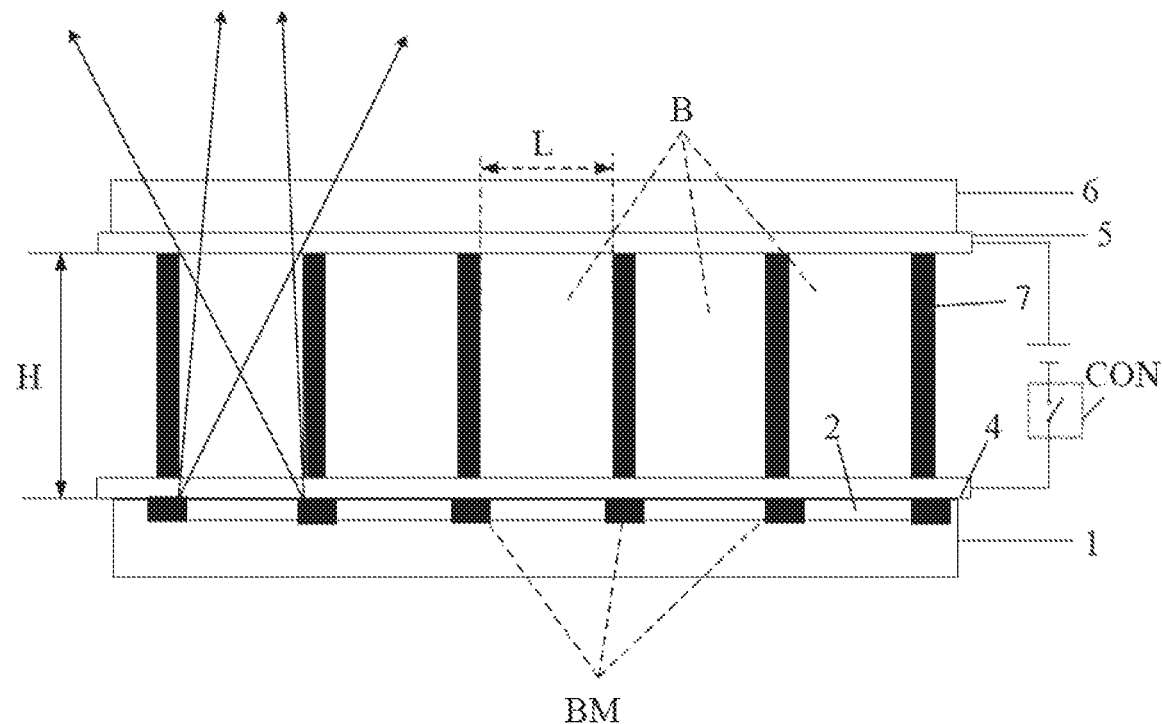
FIG. 3B is another structural schematic diagram of a display device having a peeping prevention structure according to the present disclosure.

FIG. 3B is another structural schematic diagram of a display device having a peeping prevention structure according to the present disclosure. The structure shown in FIG. 3B is mostly the same as the structure shown in FIG. 3A, except that the first substrate 3 is not disposed in FIG. 3B, and the display panel is reused as the first substrate 3. Since the display panel is reused as the first substrate 3, the structure of the display device having a peeping prevention structure is simplified, and a manufacturing process thereof is simplified. In addition, although the first electrode and the second electrode are shown as transparent planar electrodes in FIG. 3B, in practical applications, the first electrode and the second electrode in the structure shown in FIG. 3B may also be made of the metal conductive wire. Examples of the structure of the metal conductive wire may be obtained from other embodiments of the present disclosure, and thus the present disclosure will not describe it in detail.

FIG. 4 is still another structural schematic diagram of a display device having a peeping prevention structure according to the present disclosure. In FIG. 4, the first electrode and the second electrode may be made of a metal conductive wire. Compared to a structure in which the first electrode and the second electrode are transparent planar electrodes, the influence of the first electrode and the second electrode on the light emitted from the display panel is reduced due to the metal conductive wire.

Optionally, an orthographic projection of the first electrode on the display panel falls into the black matrix (BM) of the display panel, which may reduce the influence of the first electrode and the second electrode on the light emitted from the display panel.

Optionally, in a case that the first electrode is made of the metal conductive wire, an orthographic projection of an end of the transparent columnar cavity near the first substrate on the first substrate covers the first electrode; in a case that the second electrode is made of the metal conductive wire, an orthographic projection of an end of the transparent columnar cavity near the second substrate on the second substrate covers the second electrode. In this way, during a normal display state, light blocked by the metal conductive wire may be minimized.

Figure 5:
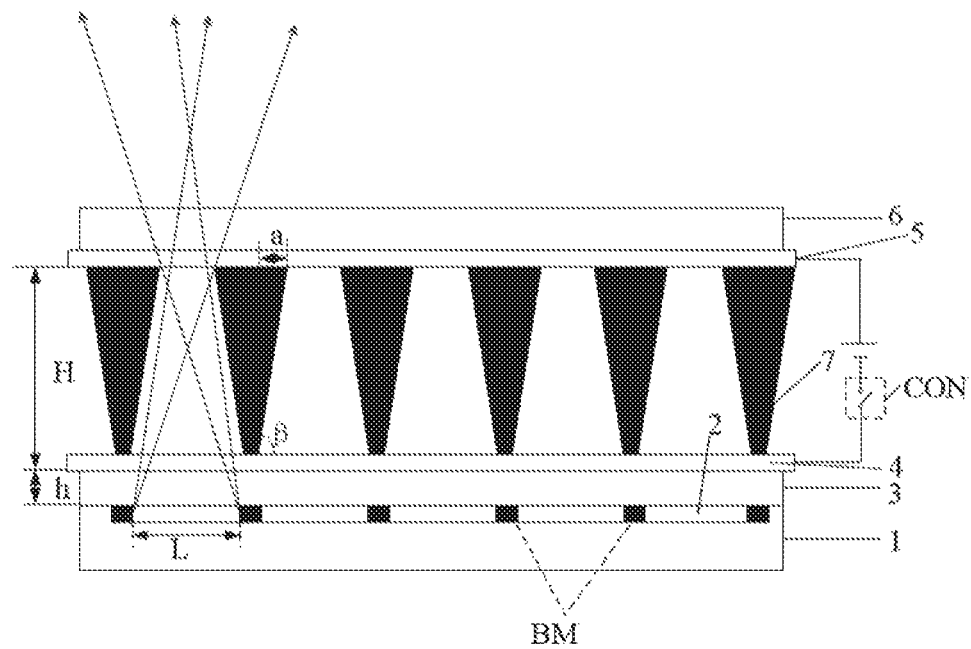
FIG. 5 and FIG. 6 are second schematic diagrams of a principle of switching between a peeping prevention state and a non-peeping prevention state according to the present disclosure.
Figure 6:
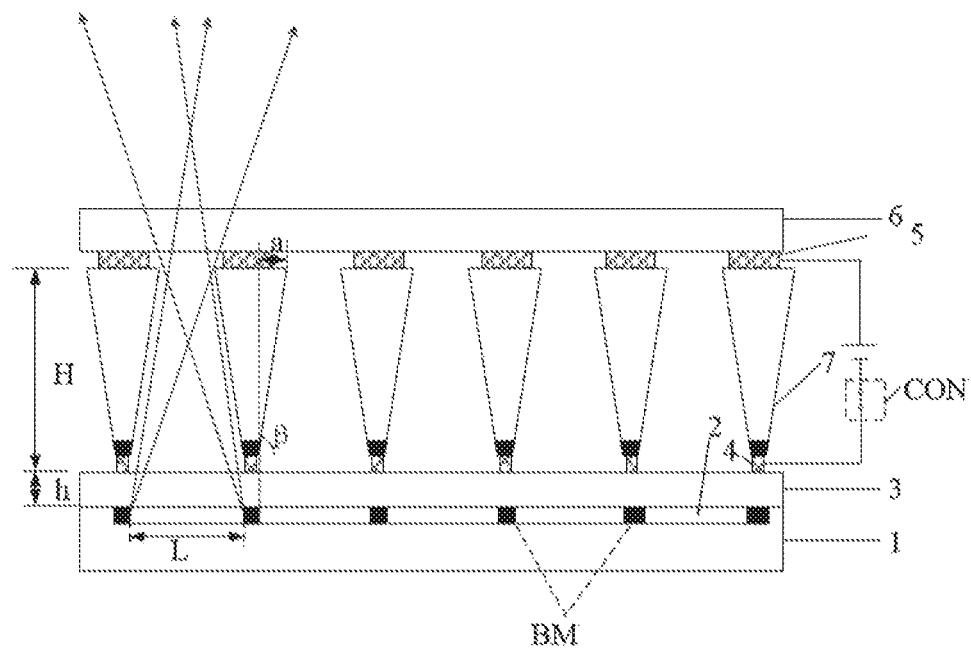

FIG. 5 and FIG. 6 are structural schematic diagrams of a display device having a peeping prevention structure according to the present disclosure. The structures of the display device shown in FIG. 5 and FIG. 6 are similar to that of the display device shown in FIG. 3A, except that a longitudinal section of the transparent columnar cavity 7 of FIG. 5 and FIG. 6 are trapezoidal.

Correspondingly, the present disclosure provides a method of manufacturing a peeping prevention structure. The method of manufacturing a peeping prevention structure may manufacture a peeping prevention structure shown in FIG. 5. The method includes the following steps, specifically, the method of manufacturing a peeping prevention structure includes the following steps: providing a first substrate 3, depositing a layer of transparent conductive material on the first substrate 3 as a first electrode 4; forming a transparent insulating film having a thickness of H on the first electrode 4, and patterning the transparent insulating film to form a plurality of transparent columnar cavities 7, wherein, the longitudinal sections of the plurality of transparent columnar cavities 7 are trapezoidal, a plurality of opening regions are defined between the plurality of transparent columnar cavities 7, the plurality of opening regions correspond to a plurality of pixels 2 of tire display panel 1 in a one to one manner; filling the transparent columnar cavity 7 with liquid and the charged light-absorbing particles 8 in the liquid, wherein, a concentration of the charged light-absorbing particles 8 is controlled to uniformly be diffused in the entirety of cavity and to form a blocking wall that blocks light; providing a second substrate 6, forming a second electrode 5 on the second substrate 6, wherein the second electrode 5 may be made of a transparent conductive material such as ITO; assembling the first electrode 4 and the second electrode 5 to form a cell and to obtain the peeping prevention structure.

In a related exposure process, an exposure is performed from top to bottom, and the amount of the exposure on the top is greater than that on the bottom. So material removed by the exposure on the top is relatively large, and manufacturing the transparent columnar cavity 7 with a trapezoidal longitudinal section greatly reduces a manufacturing difficulty. Through the above steps, the peeping prevention structure shown in FIG. 5 and FIG. 6 may be manufactured.

In a case that the display device of this example is in a peeping prevention state, as shown in FIG. 5, no electricity is applied between the first electrode 4 and the second electrode 5, and the charged light-absorbing particles 8 are uniformly diffused in the entirety of the cavity. In this way, light emitted by the pixel 2 may only be emitted through the opening region surrounded by the transparent columnar cavities 7. The higher the transparent columnar cavity 7 is, the smaller the viewing angle is, and the peeping prevention effect is tire better.

In a case that the display device of this example is in a non-peeping prevention state, as shown in FIG. 6, there is electricity applied between the first electrode 4 and the second electrode 5, and the charged light-absorbing particles 8 are concentrated on a side of one of the substrates. Optionally, the charged light-absorbing particles 8 are concentrated on the side of the first substrate 3 near the display panel. Because a black matrix BM is disposed on the display panel, an orthographic projection of the charged light-absorbing particles 8 on the display panel 1 falls into the black matrix BM, which has less influence on the display. The display panel 1 may be a liquid crystal display panel or an OLED display panel.

In FIG. 6, the first electrode and the second electrode may be made of a metal conductive wire. Compared to a structure in which the first electrode and the second electrode are transparent planar electrodes, the influence of die first electrode and the second electrode on the light emitted from the display panel is reduced due to the metal conductive wire.

Optionally, in a case that the first electrode is made of the metal conductive wire, an orthographic projection of an end of the transparent columnar cavity near the first substrate on the first substrate covers the first electrode; in a case that the second electrode is made of the metal conductive wire, an orthographic projection of an end of the transparent columnar cavity near the second substrate on the second substrate covers the second electrode. In this way, during a normal display state, light blocked by metal conductive wire may be minimized.

Figure 7:
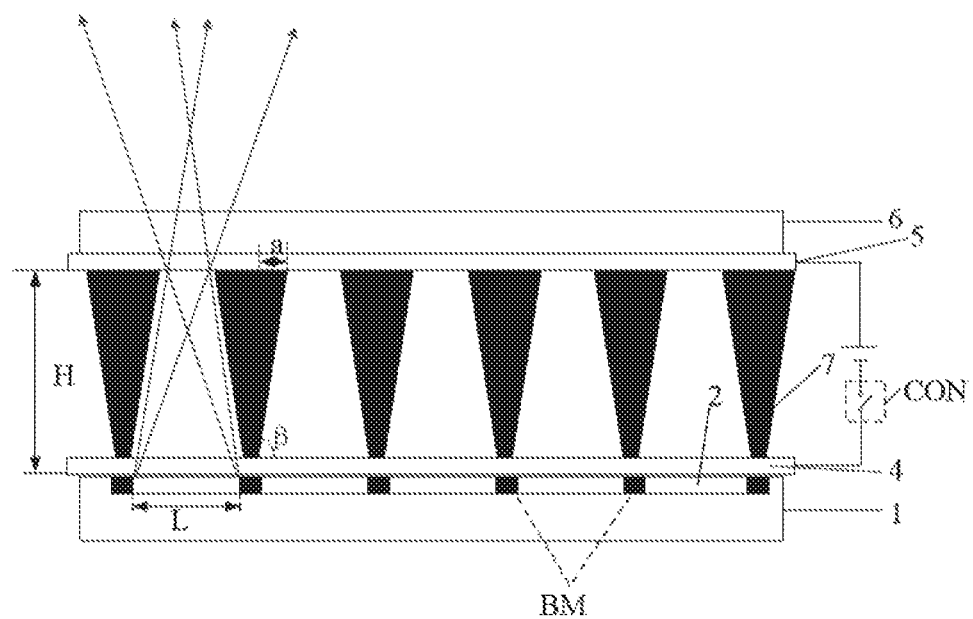
FIG. 7 is a second structural schematic diagram of a display device having a peeping prevention structure according to the present disclosure.

FIG. 7 is a structural schematic diagram of a display device having a peeping prevention structure according to the present disclosure. The structure shown in FIG. 7 is mostly the same as the structure shown m FIG. 5, except that the first substrate 3 is not disposed in FIG. 7, and the display panel is reused as the first substrate 3. Since the display panel is reused as the first substrate 3, the structure of the display device having a peeping prevention structure is simplified, and the manufacturing process thereof is simplified. In addition, although the first electrode and the second electrode fire shown as transparent planar electrodes in FIG. 7, in practical applications, the first electrode and the second electrode in the structure shown in FIG. 7 may also be made of a metal conductive wire. Examples of the structure of the metal conductive wire may be obtained from other embodiments of the present disclosure, and thus the present disclosure will not describe it in detail.

The peeping prevention effect may also be increased through the peeping prevention structure of the present disclosure. In the peeping prevention structure shown in FIG. 3A, a peeping prevention angle is $\alpha=\mathrm{actan}((H+h)/L)$; in the peeping prevention structure shown in FIG. 5, a peeping prevention angle is $\beta=\mathrm{actan}((H+h)/(L-a))$, an increase of the peeping prevention angle is $\alpha-\beta=\mathrm{actan}((H+h)/L)-\mathrm{actan}((H+h)/(L-a))$. For example, in a case that the H is 110 um, the h is 10 um, the L is 40 um and the "a" is 10 um, the corresponding increase of the peeping prevention angle is about 10 degrees. In this way, under the same peeping prevention angle, the height of the transparent columnar cavity 7 may be reduced, thereby reducing the thickness H of the peeping prevention structure.

Some embodiments of the present disclosure further provide a display device. The display device includes a display panel and the above-mentioned peeping prevention structure attached to a light emitting side of the display panel, each opening region of the peeping prevention structure corresponds to at least one pixel area of the display panel. The display device may be: a LCD TV, a liquid crystal display, a digital photo frame, a mobile phone, a tablet PC and any other products or elements having display function. The display device also includes a flexible circuit board, a printed circuit board and a back plate.

In the present disclosure, under a control of an electric field between the first electrode and the second electrode, the peeping prevention structure may be switched between the first state and the second state. In the first state, the charged light-absorbing particles are uniformly diffused in the transparent columnar cavity, to form a blocking wall that blocks light. In this way, the light emitted by the pixels of the display device may only be emitted through the opening region, thereby achieving the peeping prevention display. The higher the transparent columnar cavity is, the narrower the viewing angle is, and the better peeping prevention effect is; in the second state, the charged light-absorbing particles are concentrated at an end of the transparent columnar cavity, to achieve a normal display state. By the technical solution of the present disclosure, it is possible to switch the display device between the peeping prevention state and the non-peeping prevention state. In a case that the longitudinal section of the transparent columns cavity is trapezoidal, difficulty of the manufacturing process may be reduced and the peeping prevention effect may be further increased.

Further, the first substrate or the second substrate of the peeping prevention structure may be implemented by reusing the base substrate at the light emitting side of tire display panel, so as to reduce the thickness of the display device as much as possible.

Optionally, the plurality of opening regions of the peeping prevention structure correspond to a plurality of pixel areas of the display panel in a one to one manner, an orthographic projection of the opening region on the display panel coincides with the corresponding the pixel area.

Further, the display device further includes a controller CON, the controller CON is configured to control an electrical signal applied to the first electrode and the second electrode, so that, under a control of an electric field between the first electrode and the second electrode, the peeping prevention structure is capable of being switched between a first state and a second state; in the first state, the charged light-absorbing particles are uniformly diffused in the transparent columnar cavity; in the second state, the charged light-absorbing particles are concentrated at an end of the transparent columnar cavity.

Further, as shown in FIG. 5-FIG. 7, the peeping prevention structure includes a first substrate 3 and a second substrate 6 opposite to each other. A first electrode 4 is disposed on a side of the first substrate 3 facing the second substrate 6, a second electrode 5 is disposed on a side of the second substrates 6 facing the first substrate 3, and a transparent columnar cavity 7 is disposed between the first electrode 4 and the second electrode 5. The longitudinal section of the transparent columnar cavity 7 is trapezoidal, the transparent columnar cavity 7 is filled with liquid and the charged light-absorbing particles 8 in the liquid.

In a case that the display device is in a peeping prevention state, as shown in FIG. 5 or FIG. 7, no electricity is applied between the first electrode 4 and the second electrode 5, and the charged light-absorbing particles 8 are uniformly diffused in the entirety of the cavity. In this way, light emitted by the pixel 2 may only be emitted through the opening region surrounded by the transparent columnar cavity 7. The higher the transparent columnar cavity 7 is, the narrower the viewing angle is, and the better the peeping prevention effect is. In a case that the display device is in a non-peeping prevention state, as shown in FIG. 6, there is electricity applied between the first electrode 4 and the second electrode 5, and the charged light-absorbing particles 8 are concentrated on a side of one of the substrates. Optionally, the changed light-absorbing particles 8 are concentrated on a side of the first substrate 3 near the display panel. Because a black matrix is disposed on the display panel, an orthographic projection of the charged light-absorbing particles 8 on the display panel falls into the black matrix, which has less influence on the display effect. The display panel may be a liquid crystal display panel or an OLED display panel.

The peeping prevention effect may also be increased through the peeping prevention structure of the present disclosure. In the peeping prevention structure shown in FIG. 3, a peeping prevention angle is $\alpha=\operatorname{actan}((H+h)/L)$; in the peeping prevention structure shown in FIG. 5, a peeping prevention angle is $\beta=\operatorname{actan}((H+h)/(L-a))$, an increase of the peeping prevention angle is $\alpha-\beta=\operatorname{actan}((H+h)/L)-\operatorname{actan}((H+h)/(L-a))$. For example, in a case that the H is 110 um, the h is 10 um, the L is 40 um and the "a" is 10 um, the corresponding increase of the peeping prevention angle is about 10 degrees. In this way, under the same peeping prevention angle, the height of the transparent columnar cavity 7 may be reduced, thereby reducing the thickness H of the peeping prevention structure.

Some embodiments of the present disclosure also provide a display method of a display device, which is applied to the display device as described above and includes: controlling an electrical signal applied to the first electrode and the second electrode, so that, under a control of an electric field between the first electrode and the second electrode, the peeping prevention structure is capable of being switched between a first state and a second state: in the first state, the charged light-absorbing particles are uniformly diffused in the transparent columnar cavity; in the second state, the charged light-absorbing particles are concentrated at an end of the transparent columnar cavity.

In the present disclosure, under a control of the electric field between the first electrode and the second electrode, the peeping prevention structure is capable of being switched between a first state and a second state. In the first state, the charged light-absorbing particles are uniformly diffused in the transparent columnar cavity, to form a blocking wall that blocks light. In this way, the light emitted by the pixels of the display device may only be emitted through the opening region, thereby achieving the peeping prevention display function; the higher the transparent columnar cavity is, the narrower the viewing angle is, and the better the peeping prevention effect is. In the second state, the charged light-absorbing particles are concentrated at an end of the transparent columnar cavity, to achieve a normal display state. By the technical solution of the present disclosure, it is possible to switch the display device between the peeping prevention state and the non-peeping prevention state. In a case that the longitudinal section of the transparent columnar cavity is trapezoidal, difficulty of the manufacturing process may be reduced and the peeping prevention effect may be further increased.

Further, the method specifically includes: applying no electrical signal to the first electrode and the second electrode, so that the charged light-absorbing particles are uniformly diffused in the transparent columnar cavity; or, applying an electrical signal to the first electrode and the second electrode, so that the charged light-absorbing particles move towards the first electrode or the second electrode and are concentrated at an end of the transparent columnar cavity.

Unless defined otherwise, technical and scientific terms used in the present disclosure have common meaning understood by those of ordinary skill in the art to which the present disclosure belong. The terms "first", "second", and the like used in the present disclosure do not indicate any order, any quantity, or any importance, but are only used to distinguish different components. Words such as "include" or "comprise" mean that elements or items appearing before the word cover elements or items appearing after the word and the equivalent thereof without excluding other elements or items. Words such as "connected" or "connecting" are not limited to physical or mechanical connections, but may include electrical connections, and refer to either direct connection or indirect connection. "Up", "down", "left", "rigid", etc are only used to indicate relative position relationship. When an absolute position of the described object changes, die relative position relationship may also change accordingly.

It may be understood that when an element such as a layer, a film, a region, or a substrate is referred to as being located "on" or "under" another element, it can be "directly" located "on" or "under" the other element, or intervening elements may also be present.

The descriptions above are optional embodiments of the present disclosure, it should be noted that the improvements and the embellishments within the principle of the present disclosure may also be made by those skilled in the art, and such improvements and embellishments are also within the protection scope of the present disclosure.

What is claimed is:

1. A display device, comprising:
   a display panel, comprising a plurality of pixel areas in which a plurality of pixels is disposed, the plurality of pixels being configured to emit light;
   a peeping prevention structure, attached to a light exiting side of the display panel comprising:
   a first electrode and a second electrode opposite to each other;
   a plurality of transparent columnar cavities between the first electrode and the second electrode, wherein a plurality of opening regions are defined between the plurality of transparent columnar cavities, each of the plurality of transparent columnar cavities is filled with charged light-absorbing particles, and each of the plurality of opening regions does not include any charged light-absorbing particle;
   the plurality of opening regions is in one-to-one correspondence with the plurality of pixel areas, an orthographic projection of each of the plurality of opening regions onto the display panel fully overlaps with a corresponding one of the plurality of pixel areas;
   a shape of a cross section of each of the transparent columnar cavities in a plane perpendicular to the first electrode is trapezoidal, with a length of a first top edge of the cross section adjacent to the first electrode being shorter than a length of a first bottom edge of the cross section adjacent to the second electrode;
   a controller, configured to:
   apply an electrical signal to the first electrode and the second electrode, to cause the peeping prevention structure to be in a second state;
   not apply, in response to a first instruction for switching state, the electrical signal to the first electrode and the second electrode, to cause the peeping prevention structure to switch from the second state to a first state;
   wherein in the first state, the charged light-absorbing particles are uniformly diffused in each of the plurality of transparent columnar cavities, the plurality of transparent columnar cavities forms a barrier for shielding light, such that the light emitted by the plurality of pixels only exits through the plurality of opening regions; and
   in the second state, the charged light-absorbing particles are concentrated at an end of each of the plurality of transparent columnar cavities, such that the light emitted by the plurality of pixels exits through the plurality of opening regions and the plurality of transparent columnar cavities.

2. The display device according to claim 1, wherein the peeping prevention structure further comprises:
   a first substrate and a second substrate opposite to each other;
   wherein the first electrode is on a side of the first substrate facing the second substrate, and
   the second electrode is on a side of the second substrate facing the first substrate.

3. The display device according to claim 1, wherein,
   the first electrode is a planar transparent electrode or a metal conductive wire;
   the second electrode is a planar transparent electrode or a metal conductive wire.

4. The display device according to claim 3, wherein,
   in a case that the first electrode is the metal conductive wire, an orthographic projection, on the first substrate, of an end of the transparent columnar cavity near the first substrate covers the first electrode;
   in a case that the second electrode is the metal conductive wire, an orthographic projection, on the second substrate, of an end of the transparent columnar cavity near the second substrate covers the second electrode.

5. The display device according to claim 1,
   wherein, the first substrate or the second substrate of the peeping prevention structure is reused from a base substrate on the light exiting side of the display panel.

6. The display device according to claim 1, wherein, the display panel includes a black matrix, the black matrix is disposed between the plurality of pixel areas, a length of a second top edge for a cross section of the black matrix in the plane perpendicular to the first electrode is greater than or equal to the length of the first bottom edge of the cross section of each of the transparent columnar cavities in the plane perpendicular to the first electrode.

7. A display method of a display device, applied to the display device according to claim 1, comprising:
   controlling an electrical signal applied to the first electrode and the second electrode, so that an intensity of the electric field between the first electrode and the second electrode is controlled by controlling the electrical signal, so that the peeping prevention structure is capable of being switched between a first state and a second state,
   wherein in the first state, the charged light-absorbing particles are uniformly diffused in the transparent columnar cavity; in the second state, the charged light-absorbing particles are concentrated at an end of the transparent columnar cavity.

8. The display method according to claim 7, further comprising:
   applying no electrical signal to the first electrode and the second electrode, so that the charged light-absorbing particles are uniformly diffused in the transparent columnar cavity;
   applying an electrical signal to the first electrode and the second electrode, so that the charged light-absorbing particles move toward the first electrode or the second electrode and are concentrated at an end of the transparent columnar cavity.

9. A method of manufacturing the display device according to claim 1, comprising steps for manufacturing the peeping prevention structure, wherein the steps for manufacturing the peeping prevention structure comprises:

providing a first substrate, depositing a layer of transparent conductive material on the first substrate as a first electrode;

forming a transparent insulating film on the first electrode, and patterning the transparent insulating film to form a plurality of transparent columnar cavities;

filling charged light-absorbing particles in each of the plurality of transparent columnar cavities;

providing a second substrate, forming a second electrode on the second substrate;

assembling the first electrode and the second electrode to form a cell, so that the second electrode faces the first electrode, and the second electrode is in direct contact with the transparent insulating film.

10. The method according to claim 9, wherein filling the charged light-absorbing particles in each of the plurality of transparent columnar cavities comprises:

filling the transparent columnar cavity with liquid, and enabling the charged light-absorbing particles to be filled in the liquid, wherein, a concentration of the charged light-absorbing particles allows the charged light-absorbing particles to be uniformly diffused in an entirety of the transparent columnar cavity and to form a blocking wall that blocks light.

* * * * *